United States Patent Office.

SAMUEL PAYNE, OF LOUISVILLE, KENTUCKY.

Letters Patent No. 71,407, dated November 26, 1867.

IMPROVED MEDICAL COMPOUND.

The Schedule referred to in these Letters Patent and making part of the same.

TO ALL WHOM IT MAY CONCERN:

Be it known that I, SAMUEL PAYNE, of Louisville, in the county of Jefferson, and State of Kentucky, have invented a new and improved Medical Compound; and I do hereby declare that the following is a full, clear, and exact description thereof, which will enable others skilled in the art to make and use the same.

The present invention relates to a new and improved medical compound, especially designed for the cure of hog-cholera.

This compound is formed of the ingredients hereinbelow named, mixed together in about the proportions stated, viz: Eight (8) ounces copperas; two (2) ounces potash; two (2) ounces salt; two (2) ounces sulphur; two (2) ounces resin.

The several ingredients are first ground separately and then dried, more particularly the potash, and afterwards reduced to a fine powder. The mixture thus produced, when to be taken by the hogs, is dissolved in slops in a suitable quantity.

Having thus described my invention, I claim as new, and desire to secure by Letters Patent—

A medical compound formed of the ingredients substantially as and for the purpose described.

The above specification of my invention signed by me, this 27th day of August, 1867.

SAM'L PAYNE.

Witnesses:
JEFF. BROWN,
SAM'L MATLUCK.